Oct. 25, 1955    G. T. SMILEY    2,721,412
FISHING LINE GUIDE
Filed Jan. 7, 1955

Gerald T. Smiley
INVENTOR.

BY Clarence A. O'Brien
and Harvey B. Jacobson
Attorneys

United States Patent Office 2,721,412
Patented Oct. 25, 1955

2,721,412

FISHING LINE GUIDE

Gerald T. Smiley, Clipper Gap, Calif.

Application January 7, 1955, Serial No. 480,333

1 Claim. (Cl. 43—24)

The present invention relates to new and useful improvements in fishing line guides and has for its primary object to provide, in a manner as hereinafter set forth, a device of this character which is adapted to be expeditiously and firmly secured in position on a pole or rod without the usual tedious, laborious, and time-consuming wrapping.

Another very important object of the invention is to provide a guide of the aforementioned character embodying a novel construction and arrangement whereby the line will positively be prevented from fouling thereon.

Still another important object of the invention is to provide a fishing line guide of the character described which may be formed from a single length of suitable resilient wire.

Other objects of the invention are to provide a fishing line guide of the character set forth which will be comparatively simple in construction, strong, durable, compact, highly efficient and reliable in use and which may be manufactured at low cost.

All of the foregoing and still further objects and advantages of the invention will become apparent from a study of the following specification, taken in connection with the accompanying drawing, wherein like characters of reference designate corresponding parts throughout the several views, and wherein.

Figure 1:
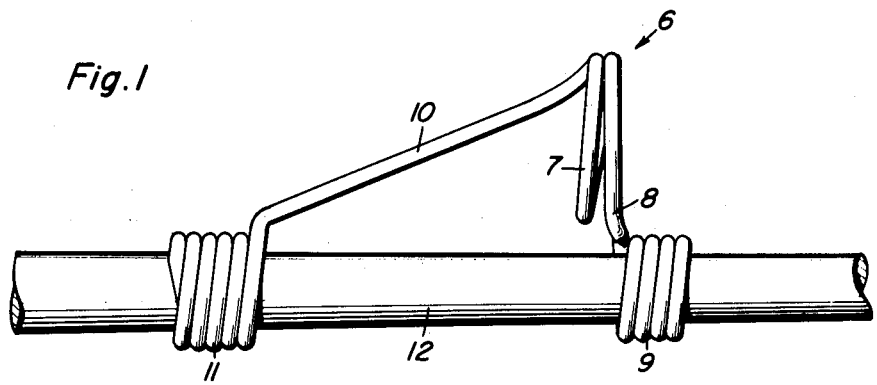
Figure 1 is a view in side elevation, showing the line guide constructed in accordance with the present invention mounted on a fishing rod.
Figure 2:
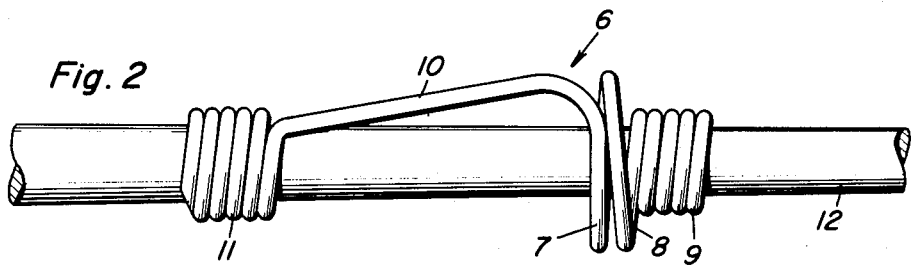
Figure 2 is a top plan view thereof.
Figure 3:
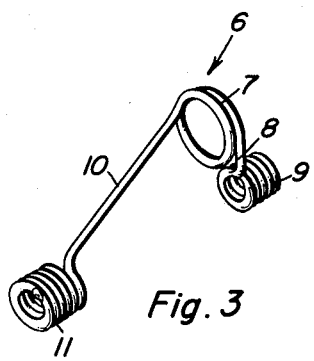
Figure 3 is a perspective view of the device.

Referring now to the drawing in detail, and to Figures 1, 2 and 3 thereof in particular, it will be seen that the guide, which is designated generally by reference character 6, comprises a single length of suitable resilient wire having an intermediate portion formed to provide a pendent loop 7 through which the fishing line (not shown) is to be threaded. Extending from one end of the loop 7 is a front arm 8 which terminates in a horizontal coil 9. Extending at a rearward and downward inclination from the other end of the loop 7 is a relatively long rear arm 10 which terminates, at its free end, in a horizontal coil 11. The coils 9 and 11 are longitudinally aligned for the reception of a conventional fishing rod, as at 12.

It is thought that the manner in which the guide is used will be readily apparent from a consideration of the foregoing. Briefly, the coils 11 and 9 are slipped longitudinally to the desired position on the rod 12 from the forward end thereof. The coils 11 and 9 are of the correct diameter to properly fit the rod 12 and, further, said coils are slightly tapered to conform to the taper of said rod. With the guide 6 in position on the rod, said rod passes beneath the loop 7. If desirable or necessary, the coils 11 and 9 may be permanently anchored in position on the rod by the application of two or more coats of suitable preparations such, for instance, as collodion, rod varnish, etc. The relatively long, rearwardly inclined arm 10 positively prevents the line from looping around the guide or loop 7.

Figure 4:
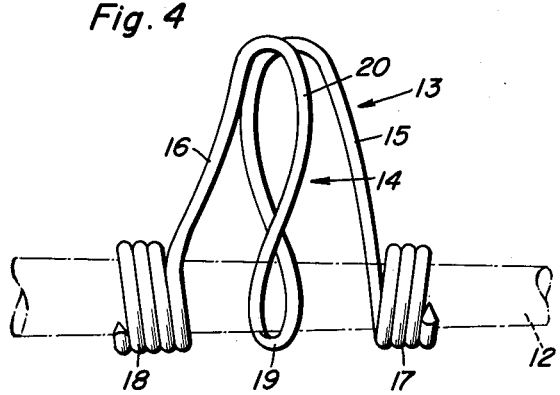
Figure 4 is a view in side elevation of a modification.
Figure 5:
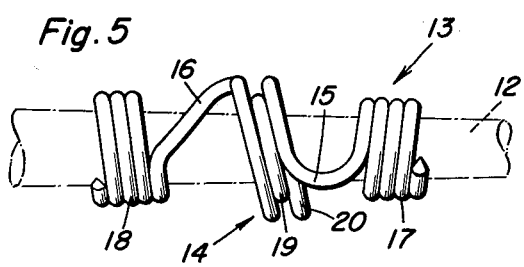
Figure 5 is a top plan view of the modification.

In the modification of Figures 4 and 5 of the drawing, reference character 13 designates generally a guide formed from a single length of suitable resilient wire having an intermediate portion bent and formed to provide a pendent loop 14 which is substantially in the form of an inverted figure 8. Front and rear arms 15 and 16 respectively extend outwardly and downwardly from the ends of the loop 14 and terminate, respectively, in longitudinally aligned, horizontal coils 17 and 18 for the reception of the rod 12. The lower portion 19 of the loop 14 is aligned with the coils 17 and 18 and the rod 12 also passes therethrough. The fishing line is threaded through the upper portion 20 of the loop 14.

In use, the guide 13 is slipped on the rod 12 from the forward end thereof and the coils 17 and 18 may be secured in the manner hereinbefore described for the coils 9 and 11. The construction and arrangement is such as to firmly support the guide in position while interfering in no way with the flexing of the rod. The arms 15 and 16 function as guards for preventing the line from fouling on the pendent loop 14.

It is believed that the many advantages of a fishing line guide constructed in accordance with the present invention will be readily understood and although preferred embodiments of the device are as illustrated and described, it is to be understood that changes in the details of construction may be resorted to which will fall within the scope of the invention as claimed.

What is claimed as new is as follows:

A fishing line guide of the character described comprising: a member having a portion formed into a pendent loop having substantially the configuration of an inverted figure 8, supporting arms extending downwardly from the ends of the loop, and coils formed on the lower ends of the arms aligned with each other and with the lower portion of the loop for the passage of a fishing rod for mounting the guide thereon, the upper portion of said loop slidably accommodating the line.

References Cited in the file of this patent

UNITED STATES PATENTS

| | | |
|---|---|---|
| 911,119 | Farr | Feb. 2, 1909 |
| 2,398,862 | Sarkisian | Apr. 23, 1946 |
| 2,573,647 | Marke | Oct. 30, 1951 |